United States Patent Office.

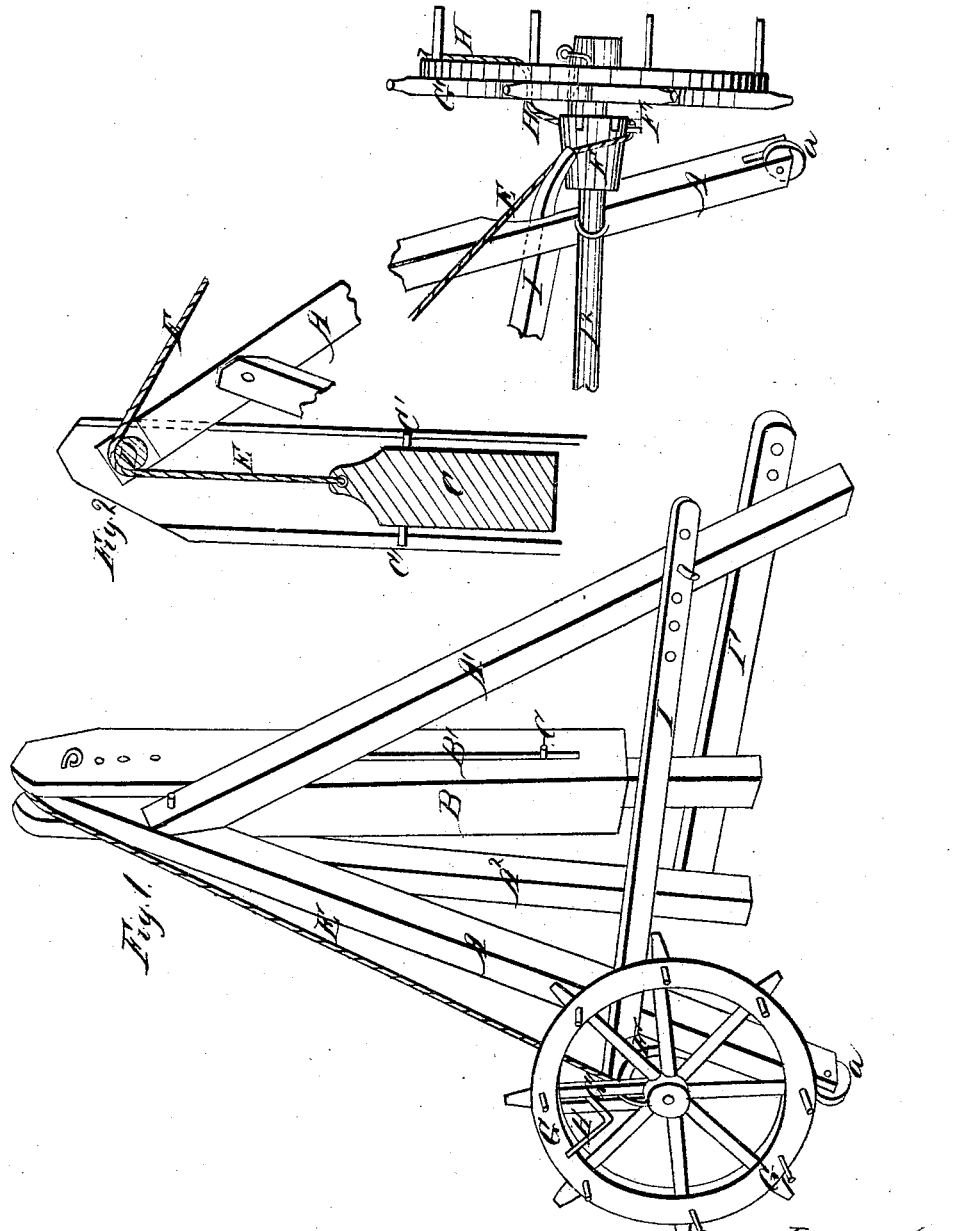

J. D. ISRAEL, OF UTICA, IOWA.

Letters Patent No. 80,962, dated August 11, 1868.

IMPROVED FENCE-POST DRIVER.

The Schedule referred to in these Letters Patent and making part of the same.

TO ALL WHOM IT MAY CONCERN:

Be it known that I, J. D. ISRAEL, of Utica, in the county of Van Buren, in the State of Iowa, have invented a new and useful Improvement in Post-Drivers; and I do hereby declare that the following is a full, clear, and exact description of the same, reference being had to the annexed drawings, making part of this specification, in which—

Figure 1 is a perspective view.
Figure 2 is a vertical section of the top.
Figure 3, an elevation of the hoisting-apparatus.
The same letters in all the figures are used to indicate the same parts.

My improvement consists in a novel arrangement of parts to form an adjustable and portable driver, for putting down posts for fences and other purposes on the land.

In the annexed drawings, A is a piece of timber, to which the pieces $A^1$ and $A^2$ are bolted, so as to form a tripod, as shown. The leg A is longer than the legs $A^1$ and $A^2$, and it has a wheel, $a$, in its foot, on which the machine can be trundled from place to place. The box B is adjustably pivoted to the top of the leg $A^1$, and it contains the hammer C, which moves freely up and down in the box, being directed by pins $C'$ passing through slots in the box. A grooved sheave, D, is placed in the top of the leg A, and over it passes a rope, E, upon which the hammer is suspended. This rope is fastened to a sleeve, F, which turns freely on the round brace $F^2$. The hand-wheel H is hung on the end of said brace. A bent lever, H, passing through the slotted spoke $G'$, is hinged to the hub of the wheel, and so formed that it may be introduced into one of a series of notches $F'$, cut in the end of the sleeve F, so as to form a rigid connection of the said wheel and sleeve. The legs are braced by three braces, I $I^1$ $I^2$, of which the two former are constructed with a series of holes, by one of which they may be connected with the leg $A^1$ by a pin, so as to permit the height of the driver to be regulated, or the tripod accommodated to inequalities of the ground, by setting the leg $A^1$ nearer to or further from the others. The brace I is carried over the sleeve F, so as to form a guide for the rope E, and keep it from running off from the sleeve.

The machine is operated in the following manner: The tripod being so moved as to bring the hammer over the post to be driven, and the height properly regulated, the wheel G and sleeve F are then to be connected by the lever H, and the weight to be raised by turning the hand-wheel and winding the rope around the sleeve. When the hammer is sufficiently elevated, the lever H is disengaged, freeing the sleeve, and permitting the weight to fall on to the head of the post.

What I claim as my invention, and desire to secure by Letters Patent, is—

The combination of the tripod, the hammer, the rope, the sleeve, the hand-wheel, and the lever, constructed and arranged substantially as described.

In testimony whereof, I have signed my name to this specification in the presence of two subscribing witnesses.

J. D. ISRAEL.

Witnesses:
    JOHN COLLINS,
    GEO. M. DETWILER.